(No Model.)
T. HYATT.
ILLUMINATING GRATINGS.
No. 254,656. Patented Mar. 7, 1882.
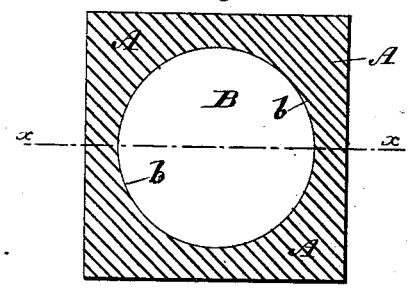
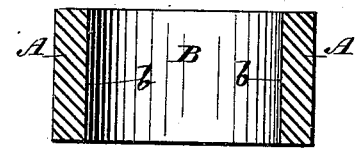
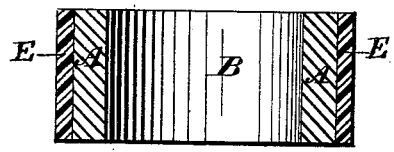
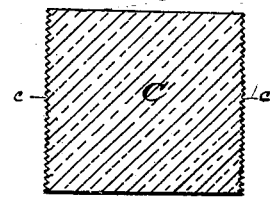
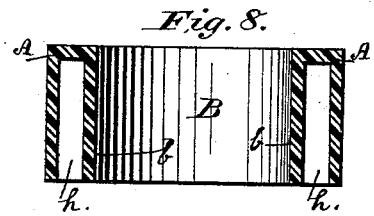
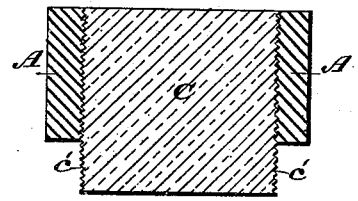
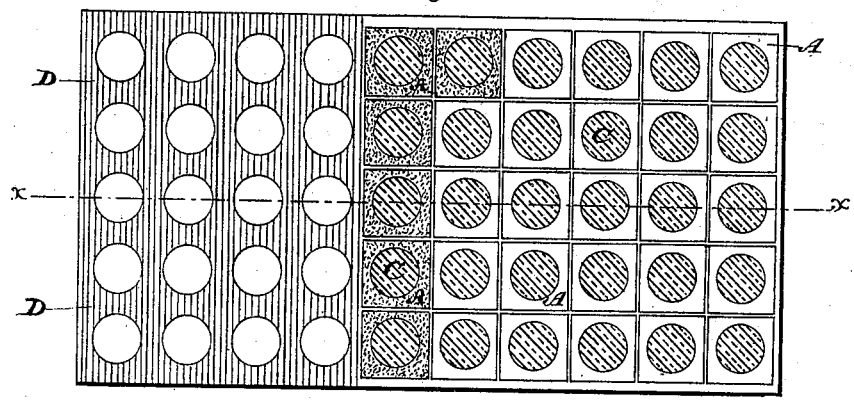
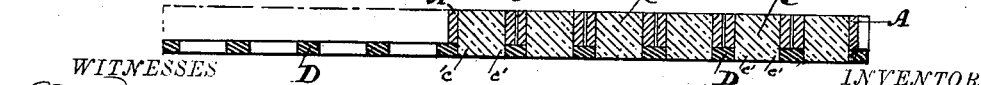
WITNESSES
INVENTOR
Thaddeus Hyatt

UNITED STATES PATENT OFFICE.

THADDEUS HYATT, OF NEW YORK, N. Y., ASSIGNOR TO ELIZABETH ADELAIDE LAKE HYATT, OF SAME PLACE.

ILLUMINATING-GRATING.

SPECIFICATION forming part of Letters Patent No. 254,656, dated March 7, 1882.

Application filed February 10, 1882. (No specimens.)

*To all whom it may concern:*

Be it known that I, THADDEUS HYATT, of the city, county, and State of New York, have invented certain new and useful Improvements in Illuminating-Gratings, of which the following is a specification.

In the drawings attached hereto, like letters refer to like parts in all the figures.

Figure 1 represents an improved glass-holder or spread-surface mount, A, formed with an opening, B, made with straight sides $b\ b$. Fig. 2 is a cross-section of Fig. 1 on the line $x\ x$. Fig. 3 represents in cross-section a glass, C, designed to fit the opening B in the mount A. Fig. 4 represents the mount A set with the glass C, $c\ c$ being the shank or lower portion of the glass below the mount. Fig. 5 represents a grating or perforated metal plate, D D, one portion being left bare and the other covered with mounts. Fig. 6 represents a cross-section of Fig. 5 on the line $x\ x$. Fig. 7 represents a mount, A, inclosed by a metal band, E. Fig. 8 represents a shell or hollow mount—$h\ h$ the hollow.

The object of my invention is, first, to simplify and cheapen the manufacture of illuminating-gratings faced with materials capable of resisting fire and forming a safe-walking foot-surface; second, to bring into suitable form and condition as a facing for illuminating-gratings—to wit, into the form of mounts—materials well adapted therefor when so conditioned that would otherwise not be employed because of serious practical difficulties attending their use, such as natural stones, asphaltum, bituminous mastic, hard rubber, and soft metals; third, to facilitate and cheapen the method of facing illuminating-gratings with mounts made of baked clay and artificial stone.

Fig. 1 represents a mount as I propose to manufacture them, the improvement consisting in adopting the plain simple flat form of geometrical tiles, and piercing or forming them with a light-hole made with practically straight sides capable of being bonded to glasses shaped to match them by the mere power of side adhesion, the glass projecting sufficiently below the mount to enter and be fixed in the light-holes of the grating. Fig. 1 is a mount without the glass. Fig. 4 shows it set with a glass. Fig. 5 shows the method of employing them to face a metal grating; and Fig. 6 shows how the facing of mounts A A is held to the grating by the shanks or projecting lower portions of the glasses $c\ c$, which take into the apertures of the grating D D.

The mounts when made of clay are molded, pressed, and baked after the manner of making geometrical tiles. Mounts of marble or other natural stone are made by sawing them out of plates of the material, first brought to the required thickness and then drilled to form the apertures for the glasses. Concrete mounts and mounts formed of plastic materials—such as papier-maché, agricultural cotton, and equivalent substances—I make in molds. Asphaltum mounts, whether made from either natural or artifical asphaltum, I form in molds from the material in powder placed while hot in the molds and there consolidated by tamping. Mounts made of bituminous mastic and equivalent materials I cast in molds lined with paper to prevent the material from sticking to the sides of the molds, the paper being afterward removed by wetting it. Mounts made of hard rubber and from soft metals when made hollow, as represented by Fig. 8, may, when desired, be backed with any suitable filling to make them solid.

What I claim, and desire to secure by Letters Patent, is—

1. Spread-surface mounts made with a central opening formed with practically straight sides, substantially as and for the purposes herein set forth and illustrated.

2. Spread-surface mounts combined with glasses, substantially as and for the purposes herein set forth and illustrated.

3. Spread-surface mounts formed of soft metals, hardened rubber, asphaltum, bituminous mastic, natural and artificial stone, plastic materials, concretes, baked clay, and their equivalents, substantially as and for the purposes herein set forth and illustrated.

4. Metal-banded spread-surface mounts, substantially as and for the purposes herein set forth and illustrated.

5. Illuminating-gratings faced with spread-surface mounts, substantially as and for the purposes herein set forth and illustrated.

THADDEUS HYATT.

Witnesses:
T. C. BRECHT,
HENRY J. HOPWOOD.